J. A. SINGMASTER, F. G. BREYER, AND C. W. FARBER.
MANUFACTURE OF LITHOPONE.
APPLICATION FILED AUG. 14, 1920.
1,411,648. Patented Apr. 4, 1922.
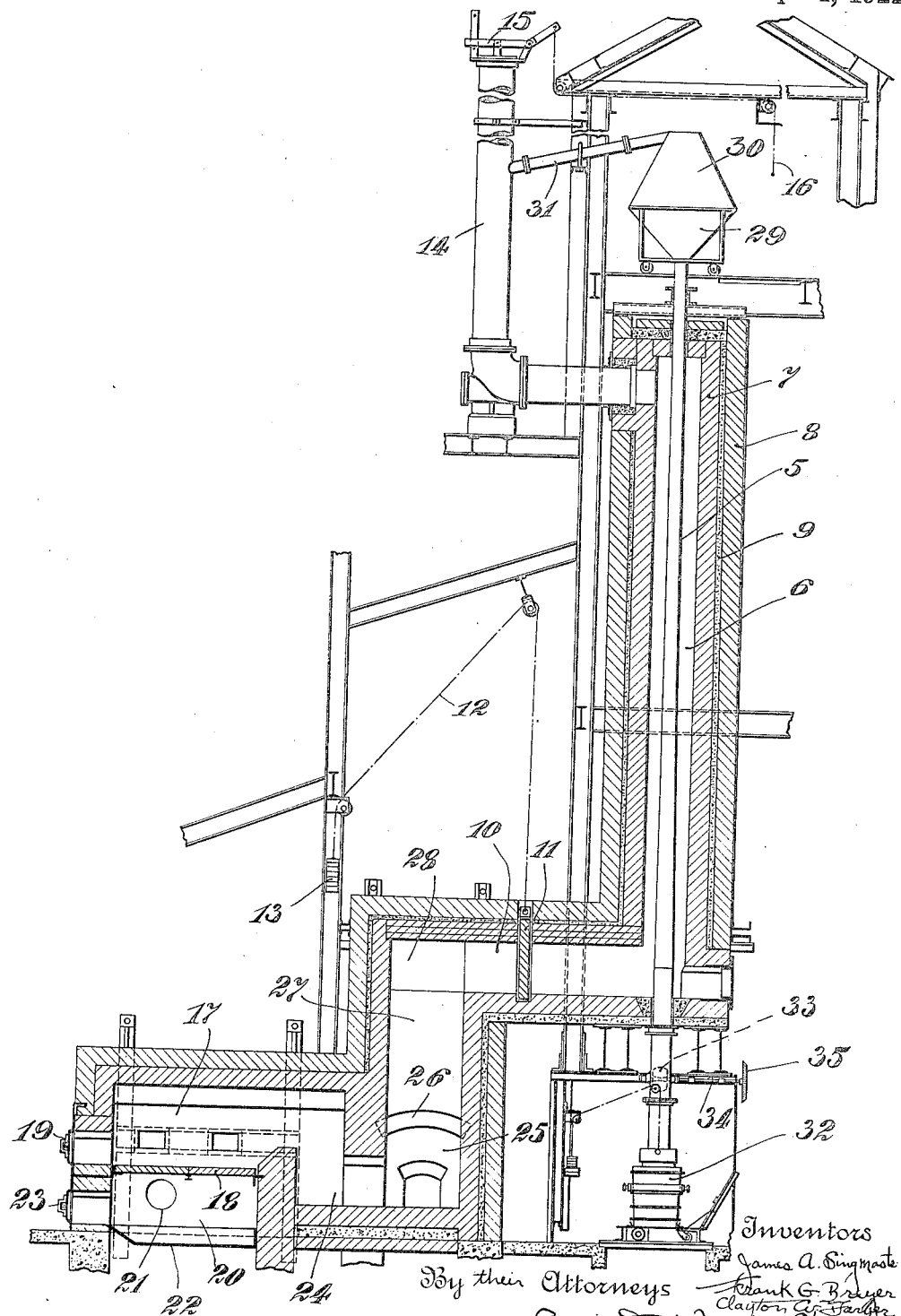

UNITED STATES PATENT OFFICE.

JAMES A. SINGMASTER AND FRANK G. BREYER, OF PALMERTON, AND CLAYTON W. FARBER, OF BOWMANSTOWN, PENNSYLVANIA, ASSIGNORS TO THE NEW JERSEY ZINC COMPANY, OF NEW YORK, N. Y., A CORPORATION OF NEW JERSEY.

MANUFACTURE OF LITHOPONE.

1,411,648.    Specification of Letters Patent.    Patented Apr. 4, 1922.

Application filed August 14, 1920. Serial No. 403,565.

*To all whom it may concern:*

Be it known that we, JAMES A. SINGMASTER and FRANK G. BREYER, both residing at Palmerton, in the county of Carbon, State of Pennsylvania, and CLAYTON W. FARBER, residing at Bowmanstown, county of Carbon, State of Pennsylvania, have invented certain new and useful Improvements in the Manufacture of Lithopone; and we do hereby declare the following to be a full, clear, and exact description of the invention, such as will enable others skilled in the art to which it appertains to make and use the same.

This invention relates to lithopone, and has for its object the provision, as a new article of manufacture, of a lithopone possessing novel and improved properties.

Lithopone is composed of barium sulfate and zinc sulfide obtained by mixing solutions of barium sulfide and zinc sulfate. It is used extensively in the arts, principally as a white pigment and as a filler for rubber goods, linoleum and the like. The precipitate of barium sulfate and zinc sulfide is washed and dried and is generally referred to as crude lithopone. This crude lithopone has a low degree of brightness, is far from perfect white in color, is hard and gritty, possesses low strength or hiding power, and has an extremely low oil absorption. Crude lithopone is, therefore, totally unsuited for paint purposes, but when it is heated, for example, to dull redness, and suddenly cooled, by plunging into cold water, is characteristics are so modified as to adapt it for paint purposes.

A satisfactory pigment for paint purposes should have good body or oil absorbing capacity and high strength or hiding power. Lithopone, in addition to these general prerequisites, should be bright and light-resistant. While crude lithopone is substantially unaffected by sunlight, the heated or muffled product is generally more or less sensitive to light, as evidenced by a pronounced darkening when exposed to sunlight. This darkening of lithopone is objectionable in most cases, and the present invention particularly contemplates the provision of an improved lithopone possessing superior light-resistant properties as well as other superior properties for paint purposes.

As ordinarily manufactured, lithopone is precipitated in the presence of some electrolyte, usually a soluble chloride heretofore generally present in the zinc sulfate solution in excess of 5 grams of chlorine per liter of zinc sulfate solution of 20° Baumé. Sodium chloride is among the most satisfactory agents for this purpose, both on account of its cheapness and its high dissociation into sodium and chlorine ions when dissolved in water. Other soluble chlorides are, of course, available for the purpose of providing the necessary electrolyte in the precipitating liquors. Frequently one or the other of the precipitating liquors already contains a certain amount of soluble chloride. Thus, soluble chlorides may be present in the zinc sulfate solution as the result of the purification of this solution from iron, manganese, or other similar impurities, which are frequently removed by the use of bleaching powder, or chlorine in some other appropriate form. Soluble chlorides may likewise be present in the zinc sulfate solution as the result of the preparation of the solution from materials which have been previously given a chloridizing roast.

It has heretofore been recognized in the art that lithopone precipitated from solutions substantially free of chlorine is highly resistant to sunlight. It is a matter of experience, however, that such lithopones, produced by the processes heretofore proposed in which chlorine is substantially absent in the precipitating liquors, are not neutral with respect to oil and varnish vehicles, that is, such lithopones have high oil absorption and marked tendencies to liver and thicken on standing or aging. It has also been known that lithopone can be made fairly light-resistant by the use of a number or additive agents, added at some point in the process of manufacture or even to the finished dry pigment. The most successful of these additive agents are of a basic nature, and one in particular, magnesium oxide, has been and is to-day used to a considerable extent. The use of these additive agents, however, is accompanied with the same objectionable effects as mentioned in connection with lithopones precipitated in solutions substantially free of chlorine, in that such additive agents render the lithopone active and increasingly liable to livering and thickening effects. Furthermore, the protective influence of these additive agents against light effects is often lost with time, and for this reason they are generally not dependable.

As pointed out in the application for Letters Patent of the United States of Frank G. Breyer, Paul R. Croll and Clayton W. Farber, Serial No. 327,921, filed October 2, 1919, it has been found that the important thing is not the entire absence of chlorine in the precipitating liquors but an understanding of the relation that exists between the amount of chlorine present in the liquors during the precipitation of the crude lithopone and the temperature at which the crude lithopone is muffled, on the one hand, and the strength or hiding power, light-resistance, oil-absorption, and color of the muffled product, on the other hand. Thus, it has been found that the muffling temperature, necessary to give lithopone satisfactory strength, is raised by decreasing the chlorine content of the precipitating liquors. For example, when there is present in the precipitating liquors an amount of chlorine equivalent to 9 grams of chlorine per liter of the zinc sulfate solution employed calculated at 20° Baumé, an amount commonly employed in commercial practice, satisfactory strength can be imparted to the lithopone with a muffling temperature of about 600° C., or slightly less, while a muffling temperature of between 650° C. and 800° C. is required to give satisfactory strength to a lithopone when the chlorine content of the liquors from which the lithopone was precipitated is the equivalent of less than 1 gram of chlorine per liter of zinc sulfate solution employed, calculated with respect to a solution of a concentration of 20° Baumé. Between the two examples just mentioned, the muffling temperature necessary to impart to the lithopone the desired strength and color increases as the chlorine content of the precipitating liquors is decreased.

In addition to the critical strength temperature, that is to say, the temperature necessary to give the lithopone the desired strength or hiding power, there is a critical light-resistance temperature. As heretofore explained, the crude lithopone is practically unaffected by sunlight, but becomes sensitive to light as the result of the muffling treatment, and by the critical light-resistance temperature, we mean the temperature to which lithopone can be heated without losing its resistance to light beyond a certain desirable limit. As explained in the aforementioned application, it has been found that the critical light-resistance temperature, as well as the critical strength temperature, is raised as the chlorine content of the precipitating liquors is lowered. The rise in critical light-resistance temperature being proportionately much greater than the rise in critical strength temperature, there is obtained, as the chlorine content is decreased, increasingly greater light-resistance at the corresponding critical strength temperature. Thus, the critical light-resistance temperature of a lithopone, precipitated in the presence of the equivalent of about 9 grams of chlorine per liter of 20° Baumé zinc sulfate solution, is well below the critical strength temperature for this lithopone (around 600° C.) and, accordingly, when such a lithopone is muffled at its critical strength temperature, it has poor light-resistance. When, however, a lithopone precipitated in the presence of the equivalent of less than one gram of chlorine per liter of zinc sulfate solution employed, calculated at 20° Baumé, is muffled between 650° C. and 800° C., its critical strength temperature, an excellent light-resistant material is obtained.

The color of a lithopone is improved very markedly by higher muffling temperatures, and consequently tends to improve as the critical strength temperature rises with lithopones precipitated from solutions of lower chlorine content, provided the muffling is carried out as hereinafter described.

The oil-absorbing properties of a lithopone with a given muffling temperature are also dependent upon the chlorine content of the precipitating liquors. The lower the chlorine content of the precipitating liquors, the higher is the oil absorption. We have found that the oil absorption of a lithopone gradually increases as the chlorine content of the precipitating liquors is decreased (the lithopone being muffled at the appropriate critical strength temperature corresponding to the particular chlorine content in hand) until the chlorine content of the precipitating liquors is about the equivalent of one gram (or slightly less) of chlorine per liter of 20° Baumé zinc sulfate solution, when the oil absorption increase abruptly upon further decrease in the chlorine content.

As described in the aforementioned application of Breyer, Croll and Farber, it has been determined that a lithopone possessing the optimum properties for paint purposes can be obtained when the chlorine content of the precipitating liquors is less than the equivalent of two grams of chlorine per liter of the zinc sulfate solution employed, calculated with respect to a solution having a concentration of 20° Baumé, and the crude lithopone muffled at the appropriate critical strength temperature, of from about 650° to 800° C. Excellent results have been secured when the precipitating liquors have a chlorine content the equivalent of about one gram (or slightly less) of chlorine per liter of 20° Baumé zinc sulfate solution.

In practice, the zinc sulfate solution is first run into the precipitating vat. Depending upon the purifying reagents, the zinc sulfate solution usually contains more or less chlorine, to which amount is added, generally in the form of common salt (NaCl), sufficient further chlorine to bring the total up to 0.1 to 2 grams (and preferably about 1 gram or slightly less) per liter calculated as aforementioned. The barium sulfide solution is then slowly added to the precipitating vat and the reaction mass thoroughly stirred for an appropriate period of time, usually about one hour, to complete the chemical reactions involved.

The precipitation of the lithopone may take place in the presence of some other electrolyte than a soluble chloride. For example, sulfuric acid may, under certain circumstances, be employed for this purpose. In fact, it is frequently the practice to add a certain small amount of sulfuric acid to the zinc sulfate solution. Generally, the amount of sulfuric acid thus added is in the neighborhood of from 0.3 to 0.5% of the combined precipitating liquors, calculated as 60° Baumé acid with respect to a zinc sulfate solution of 20° Baumé and a barium sulfide solution of 12° Baumé. Sulfuric acid acts as an electrolyte in the precipitation of lithopone, and its effect is for the most part similar to that of a soluble chloride. We find that the use of sulfuric acid as an electrolyte during the precipitation of lithopone, in the relatively large quantities heretofore customary, produces substantially similar objectionable consequences as are produced by the use of the heretofore customary relatively large amount of a soluble chloride. For this reason, in the production of the improved lithopone of the present invention, we prefer, when using sulfuric acid as an electrolyte in the precipitation of lithopone, either alone or in conjunction with a soluble chlori e, to employ an amount of acid not in excess of 0.1% of the combined precipitating liquors, calculated as 60° Baumé acid with respect to zinc sulfate solution of 20° Baumé and barium sulfide solution of 12° Baumé.

In accordance with the general practice of lithopone manufacture, the precipitate resulting from the interaction of the solutions of zinc sulfate and barium sulfide is filter-pressed and, after appropriate drying, is heated or muffled, and the resulting hot product plunged directly from the heating chamber into cold water. The improved lithopone of our invention is obtained by muffling the crude and dried, or partially dried, lithopone in a continuous vertical muffle through which the material is passed by gravity, the muffle being properly proportioned to secure uniformity of heating and being constructed to exclude air or other oxidizing gases from the lithopone as it passes therethrough. Since a relatively small amount of overheated or underheated material will affect the entire product, it is most important, if the optimum qualities are to be obtained, that the muffle be so proportioned that the material treated therein be uniformly heated (both as to temperature and time) and the muffle must, therefore, be specially designed with this in view.

We have found that in a vertical muffle, through which the material passes by gravity, with consequently little or no agitation, there is a relationship between the cross section and length of the muffle employed which cannot be exceeded without producing non-uniform material. We believe that the carrying of the heat in such a muffle to the center of the column is largely due to its being transferred by the rising gases present, in addition to direct conduction. When the cross section is unduly increased, we believe that channeling of the gases takes place with consequent non-uniformity of the product. We do not wish to restrict ourselves to this theory, although it seems the plausible explanation for the phenomena we have observed. We do know, however, that the limits of this relationship between cross section and length are quite close, and we have, for example, found in actual practice that an iron tube 25 feet long and 10 inches in diameter gives a uniform product, whereas a tube of the same length and of 12 inches in diameter gives a perceptibly non-uniform product.

It is our present preferred practice to employ a vertically disposed cylindrical retort or muffle made of iron, or extra heavy steel pipe, or of other good heat-conducting material, of about 10 inches in diameter and about 25 feet in length. If desired, the cylindrical retort may be of tapered section, that is, progressively increasing in diameter from the top towards the bottom, and such a configuration assists, to some extent, the ready passage by gravity of the lithopone through the retort.

A vertical retort and cooperating furnace for muffling lithopone and producing the improved product of this invention is illustrated in the accompanying drawing, in which the single figure is a sectional end elevation of the furnace structure.

Referring now to the drawing, the retort or muffle 5 may conveniently be made of a cylindrical pipe of wrought iron or of extra heavy steel pipe. The diameter and length of the pipe should be appropriately proportioned to insure uniform heating of the lithopone for the necessary period of time. We have secured excellent results with a wrought iron pipe 10 inches in diameter and from 25 to 30 feet in length. The retort 5, or an appropriate portion thereof intermediate the top and bottom, may, if desired, be slightly tapered, for example, the diameter of the pipe may progressively increase from the top towards the bottom (say from 9 inches to 10 inches over a length of 12 feet or so).

The retort 5 is surrounded by a flue 6 for heating gases. The retort and flue are embodied in a furnace structure made up of inner walls 7 of fire brick, or other appropriate heat refractory material, and outer walls 8 of red brick. A space is preferably left between the fire brick walls 7 and the exterior red brick walls 8, and this space may advantageously be filled with heat resisting and insulating material 9, such, for example, as powdered sil-o-cel or sil-o-cel brick.

The retort 5 extends an appropriate distance above and beneath the furnace structure, but is otherwise surrounded throughout substantially its entire length by the flue 6. A port 10 communicates with the lower end of the flue 6 and serves to conduct heating gases to the flue. A damper 11 is operatively mounted in the port 10 and may advantageously consist of a slab of firebrick or other appropriate refractory material which is vertically adjustable in the port 10 so as to vary the effective opening of the port. The damper 11 may conveniently be adjusted by means of a cable 12 and cooperating counterweight 13.

The flue 6, near its top, communicates with a stack 14 for carrying away the exhaust heating gases therefrom. The stack is provided with a valve or damper 15 for controlling the draft therethrough. The damper 15 is arranged to be operated from the retort charging floor by means of a cable 16.

A combustion chamber 17 is provided for the combustion of fuel and the generation of hot products of combustion for the supply of heating gases to the flue 6. As represented in the drawing, the combustion chamber has a grate 18 suitable for the burning of coal and is provided with appropriate charging doors 19. An air compartment 20 is provided beneath the grate 18 and is arranged to be supplied with air under appropriate pressure from an air supply pipe 21. The air compartment 20 contains an ash pan 22 which serves as an ash pit for the ashes and cinders falling through the grate 18, and appropriate doors 23 are provided for removing ashes and cinders from the ash pan.

The combustion chamber 17 terminates at its rear in a vertical passage 24 which communicates with the lower end of a heat equalizing chamber. The heat equalizing chamber has a manifold or compartment 25 at its lower end which is in free communication throughout its entire length with the passage 24. Above the manifold 25, the equalizing chamber is provided with a plurality of spaced arches 26 upon which are supported slabs 27 of fire brick or other appropriate refractory material. The slabs 27 terminate at their upper ends substantially at the lower level of the port 10 so that above the slabs 27 there is a manifold or compartment 28 with which the port 10 communicates.

The vertically disposed slabs 27 provide a plurality of vertical passages of relatively large surface area and have, in addition, considerable heat storage capacity. By these agencies, slight variations in temperature of the products of combustion are effectively neutralized in the heat equalizing chamber, so that the heating gases delivered to the flue 6 are of substantially uniform temperature and practically independent of the slight fluctuations in temperature which the hot products of combustion undergo.

The top of the retort 5 is open to permit the escape of gases. In the drawing, we have represented a car or hopper 29 mounted on appropriate rails and positioned directly above the open top of the retort for continuously feeding lithopone into the retort. The car or hopper 29 is filled with lithopone, and when emptied is replaced by a full car without interrupting the continuity of the muffling operation. If desired, the hopper 29 may have a hood 30 communicating by a pipe 31 with the stack 14 for carryng away the fumes and gases which are evolved at the top of the retort.

The lower end of the retort 5 projects into a body of cold water in a suitable receptacle 32. If desired, water may be continuously supplied to and withdrawn from the receptacle 32 in order to maintain the body of water therein at the desired temperature to effect the sudden cooling of the lithopone discharged from the retort. In the drawing, we have indicated a star-wheel discharge 33 mounted in the lower end of the retort structure beneath the furnace structure. This star-wheel discharge comprises a rotatably mounted star wheel 33 having four blades or wings. The shaft 34 of the star-wheel is given a quarter turn at predetermined intervals by means of a star-wheel actuator 35. Each time the star-wheel is turned through a quarter revolution a definite amount of lithopone is discharged from the retort into the body of water in the receptacle 32. Various mechanical agencies may be employed for periodically turning the star-wheel actuator 35 through a quarter of one turn.

In the normal operation of the apparatus illustrated in the drawing, the retort 5 is filled with the lithopone. The crude lithopone, as it is charged into the top of the retort, is generally in the form of small lumps, and the spaces between these lumps of lithopone, during the muffling operation, are filled with the gases evolved from the lithopone at the muffling temperature, so that the lithopone within the retort, during the entire muffling operation, is surrounded by a non-oxidizing atmosphere composed, for the most part, of hot water vapor. The gases driven off from the lithopone during the muffling operation escape through the open top of the retort. The amount of these gases and the design of the retort are such that there is maintained within the retort, and more especially in the active muffling zone thereof, a gaseous pressure slightly greater than atmospheric pressure, whereby the entrance of air into the retort is effectively and positively prevented.

In the upper part of the retort the incoming lithopone is subjected to the hot gases escaping from the active muffling zone of the retort. These hot gases serve to dry and preheat the lithopone, and more particularly they serve to drive off from the incoming lithopone any occluded or entrained air, so that when the lithopone reaches the active muffling zone practically all of the air entrained in the original raw lithopone has been eliminated. This insures the muffling of the lithopone under the desired non-oxidizing conditions. As the result of this preheating stage in our muffling operation, we may, if desired, feed into the retort a lithopone containing more moisture than has heretofore been possible in the usual lithopone muffles. For this reason, when muffling in accordance with our present practice, the lithopone need not be dried as thoroughly or as carefully as has heretofore been necessary. After filter-pressing, the crude lithopone ordinarily contains about 50% of moisture. It has heretofore been customary to dry the lithopone until its moisture content was reduced to about 1 or 2%. When muffling in accordance with the herein described method, the crude lithopone may, if desired, be dried until its moisture content is about 10%, thereby materially reducing the cost of drying.

During the muffling operation, the lithopone is maintained in the active muffling zone of the retort at an appropriate muffling temperature for the necessary period of time to secure the desired degree of strength, color and brightness. We have found that excellent results may be obtained when the rate of discharging and charging of the retort is so proportioned that a period of from about 5 to 10 hours is required for the lithopone to travel from the top of the retort to the bottom thereof, during which period the lithopone is subjected to a temperature of from about 550° to 800° C., depending upon the nature of the crude material and the properties desired in the finished product.

The muffled lithopone, as will be understood by those skilled in the art, is removed from the water in the receptacle 32 and subjected to further treatment, such as washing, grinding and drying, substantially in accordance with the present practice.

We have found that lithopone, muffled as herein described, possesses marked superior properties over lithopone heated in ordinary muffles in accordance with the heretofore customary practice. In particular, we have found that lithopone muffled as herein described is remarkably resistant to deterioration from sunlight. In other words, the herein described muffling operation results in the production of a superior product having improved light-resisting properties.

The muffling operation employed in the production of our improved lithopone insures the provision of a non-oxidizing atmosphere during the entire period that the lithopone is subjected to the effective muffling temperature. While the importance of muffling lithopone under non-oxidizing conditions has heretofore been recognized, no method has heretofore been employed or suggested, as far as we are aware, in which such an effective and satisfactory non-oxidizing environment is obtainable as in the muffling practice hereinbefore described.

As a result of our investigations, we have determined that very slight oxidizing influences during the muffling operation result in the formation of appreciable amounts of zinc oxide which can be readily detected in the muffled product by testing with acetic acid. In other words, acetic acid will dissolve such zinc as is present in the lithopone in the form of oxide. The improved lithopone of our invention as a result of its muffling in the hereinbefore described manner has an acetic acid soluble zinc content not exceeding one per cent, calculated as zinc oxide. In fact, the acetic acid soluble zinc in our improved lithopone is usually less than 0.5% (ZnO), and we have found as the average of a large number of samples an acetic acid soluble zinc content of 0.3–0.4% (ZnO). Moreover, in the improved lithopone of the invention, the remainder of the total zinc content (that is, the total zinc content minus the acetic acid soluble zinc) calculated as zinc sulfide is preferably not less than 27%, while the barium sulfate content of our improved lithopone is preferably around 70%. In the following table is given the chemical analysis of two representative samples of the improved lithopone of the invention:

|  | No. 1. | No. 2. |
|---|---|---|
|  | Per cent. | Per cent. |
| $H_2O$ at 110° C | .13 | .17 |
| Acetic acid sol. Zn as ZnO | .40 | .30 |
| $H_2O$ sol. salts, dried at 110° C | .14 | .13 |
| Cl | .02 | .03 |
| $BaSO_4$ | 70.52 | 69.83 |
| CaO | .07 | .11 |
| MgO | .01 | .01 |
| Total Zn minus acetic acid sol. Zn as ZnS | 27.40 | 27.6 |
| Undetermined $SiO_2$, $Al_2O_3$, Sr, alkalies, etc | 1.31 | 1.82 |
|  | 100.00 | 100.00 |

While the improved lithopone of the invention is characterized chemically by its relatively low acetic acid soluble zinc content, the property which is basically of the greatest importance from the standpoint of the theory of light resistance is its relative and peculiar inactivity to ultra-violet light. Our investigations have shown a persistent relationship in lithopone between reactivity to ultra-violet light and actual darkening when exposed to sunlight and moisture, and references occur in the literature attributing the darkening of lithopone to the ultra-violet light rays present in ordinary sunlight.

Most pigments show more or less activity when exposed to ultra-violet light, that is they convert invisible ultra-violet rays into visible light rays, although they do not all darken as a consequence of this activity. If, for example, samples of zinc oxide, corroded white lead, and ordinary lithopone (such as heretofore produced) are exposed, either dry, or as a paste in water, in glycerine or in oil, to ultra-violet light in a room where all visible light rays are excluded, we should still be able to see each of the three pigments because some of the ultra-violet light would be converted by the pigments into visible light rays, giving the zinc oxide a yellowish color, the corroded white lead a grayish color and the ordinary lithopone a very brilliant yellowish fluorescence. The specimen of the improved product of our invention would, however, under the same condition, be entirely or substantially invisible, indicating complete or substantial inactivity to the ultra-violet rays.

In practice, it is difficult to get the above ideal conditions, since a source of ultra-violet rays which does not contain any visible light rays cannot be readily obtained. It is, however, a very simple matter by the use of suitable glass or other screens to screen out almost all the visible light rays from a given source and still let through considerable ultra-violet rays.

A material that is not reactive to ultra-violet light exposed under the aforementioned conditions will reflect the rays of visible light that get through the screen unchanged whereas a material that is at all reactive to the ultra-violet rays will convert so much of these ultra-violet rays into other colors that the small amount of visible light reflected will be completely masked by the converted rays and the material will have some color entirely different from that of the original visible light rays.

In carrying out the ultra-violet light test, the lithopone may conveniently be made into a paste with water and laid down on a porcelain palette and dried. We have commonly used an iron arc as our source of light and screened the emitted rays through a special glass filter which lets through only a very small amount of reddish and violet light and quite a percentage of ultra-violet rays. When ordinary lithopone is exposed in a dark room to this filtered light, it fluoresces most remarkably, being in this respect comparable to uranium nitrate, calcium tungstate and Willemite ore. The improved product of our invention, however, (when exposed to this light) reflects only the reddish and violet light rays thereof, giving a purple color similar to the color reflected by the inactive porcelain palette on which the specimens are laid down and dried.

The pnenomenon of converting ultra-violet rays into visible light rays is explained scientifically by the presence in a material of a percentage of dissociated atoms in which there are electrons whose period of vibration is suitable to the absorption of the ultra-violet waves. This energy then is available for the production of waves of other periodicity.

Crude unmuffled lithopone is entirely inert to ultra-violet light. When muffled in the heretofore customary manner, however, where quite a degree of oxidation and dissociation can take place, the lithopone becomes very reactive, and in general, the higher the temperature of muffling the more reactive to ultra-violet light is the muffled product.

In the controlled uniform muffling process of our preferred practice, these changes are reduced to a minimum as evidenced by the low percentage of zinc sulfide converted into zinc oxide. And, accordingly, when the improved lithopone of the invention is subjected to the hereinbefore described ultra-violet light test it shows the same color as a sample of dry crude unmuffled lithopone from which the muffled product was made.

We do not wish to restrict ourselves to the above explanation of the facts, but we believe that the theory advanced at least correlates what is known on the subject to-day.

A lithopone possessing low oil absorption approaching that of corroded white lead is desirable for all flat finishes, as well as for mixed paints, especially where the other pigment has high oil-absorbing properties like zinc oxide. While we do not propose to limit the present invention to lithopones of relatively low oil absorption, we wish to point out that by appropriate control of the amount of chloride (or other appropriate electrolyte) in the precipitating liquors, as hereinbefore explained, the lithopone of the invention may, when desired, possess an oil-absorption approaching that of corroded white lead. For example, when the precipitating liquors contain the equivalent of one gram or slightly less of chlorine per liter of zinc sulfate solution (calculated as hereinbefore mentioned) and the crude lithopone is muffled at the appropriate critical strength temperature corresponding to this chlorine content, a lithopone is obtained which possesses relatively low oil-absorption approaching that of corroded white lead.

The improved lithopone of the invention is, moreover, characterized by its remarkable freedom from grit. Grit is an aggregation of particles, usually from hundreds to thousands of particles, which are fused together and cannot be separated by the deflocculating power of oil, rubber, or the like. Grit in lithopone is readily detected under a knife when rubbed down, or, in the case of paints, when thin films are formed on glass, and is detected in rubber goods when sheeted into thin layers. Grit, being from hundreds to thousands times the mass of the average particles of the material, is objectionable in lithopones to be used in making enamels or in filling certain kinds of rubber goods. The improved lithopone of the invention is practically free of grit, and it owes this valuable property, in a very large measure, if not entirely, to the method we employ in muffling by which the particles are kept in constant motion during the muffling operation, and no opportunity is afforded for aggregates of particles to adhere to the heated surfaces of the muffle with consequent liability for such aggregates to fuse together and form grit.

The lithopone of the invention is of excellent color, having a slight bluish tint which is very desirable in a white pigment. It is, moreover, bright and smooth and contains no specks. Its hiding power is also very good.

We are aware that occasional references occur in the technical literature to lithopones of relatively low zinc oxide content, for example, one per cent or less, but, so far as we are aware, such lithopones when possessing relatively low oil absorption are non-light resistant, or if light resistant have relatively high oil absorption. Our improved lithopone, in addition to its low acetic acid soluble zinc content, is not only highly resistant to sunlight but may also possess relatively low oil absorption.

We claim:—

1. As a new article of manufacture, a lithopone which is practically non-reactive to ultra-violet light.

2. As a new article of manufacture, a lithopone which when laid down in a water paste and dried on a white porcelain palette is of substantially the same color as the palette when exposed to ultra-violet light in the substantial absence of visible light rays.

3. As a new article of manufacture, a lithopone which when subjected to the hereinbefore described ultra-violet light test shows the same color as a sample of dried crude unmuffled lithopone from which the muffled product was made.

4. As a new article of manufacture, a lithopone which is highly resistant to sunlight and practically non-reactive to ultra-violet light.

5. As a new article of manufacture, a lithopone which is highly resistant to sunlight and possesses relatively low oil absorption and which is practically non-reactive to ultra-violet light.

6. As a new article of manufacture, a lithopone possessing relatively low oil absorption and which is practically non-reactive to ultra-violet light.

7. As a new article of manufacture, a lithopone containing by analysis about 0.02–0.03% of chlorine and in which the acetic acid soluble zinc calculated as zinc oxide does not exceed 1%.

8. As a new article of manufacture, a lithopone containing by analysis about 0.02–0.03% of chlorine and less than 0.5% of acetic acid soluble zinc calculated as zinc oxide.

9. As a new article of manufacture, a lithopone containing about 70% of barium sulfate and about 0.02–0.03% of chlorine and in which the acetic acid soluble zinc calculated as zinc oxide is less than 0.5% while the remainder of the total zinc content of the lithopone calculated as zinc sulfide is not less than 27%.

10. As a new article of manufacture, a lithopone which is highly resistant to sunlight and practically non-reactive to ultra-violet light and in which the acetic acid soluble zinc calculated as zinc oxide is less than 1%.

11. As a new article of manufacture, a lithopone possessing relatively low oil absorption and which is practically non-reactive to ultra-violet light and in which the acetic acid soluble zinc calculated as zinc oxide is less than 1%.

12. As a new article of manufacture, a lithopone which is practically non-reactive to ultra-violet light, and in which the acetic acid soluble zinc calculated as zinc oxide does not exceed 1%.

13. As a new article of manufacture, a lithopone which is practically non-reactive to ultra-violet light, and in which the acetic acid soluble zinc calculated as zinc oxide is less than 0.5%.

14. As a new article of manufacture, a lithopone possessing relatively low oil absorption and which is practically non-reactive to ultra-violet light and in which the acetic acid soluble zinc calculated as zinc oxide does not exceed 0.5%.

15. As a new article of manufacture, a lithopone which is highly resistant to sunlight and possesses relatively low oil absorption and in which the acetic acid soluble zinc calculated as zinc oxide does not exceed 1%.

16. As a new article of manufacture, a lithopone which is highly resistant to sunlight and in which the acetic acid soluble zinc calculated as zinc oxide does not exceed 1%.

17. As a new article of manufacture, a lithopone which is highly resistant to sunlight and in which the acetic acid soluble zinc calculated as zinc oxide is less than 0.5%.

18. As a new article of manufacture, a lithopone possessing relatively low oil absorption and in which the acetic acid soluble zinc calculated as zinc oxide does not exceed 1%.

19. As a new article of manufacture, a lithopone possessing relatively low oil absorption and in which the acetic acid soluble zinc calculated as zinc oxide is less than 0.5%.

20. As a new article of manufacture, a lithopone practically free of grit and in which the acetic acid soluble zinc calculated as zinc oxide does not exceed 1%.

21. As a new article of manufacture, a lithopone which is practically non-reactive to ultra-violet light and is practically free of grit.

22. As a new article of manufacture, a lithopone which is highly resistant to sunlight and practically non-reactive to ultra-violet light and in which the acetic acid soluble zinc calculated as zinc oxide is less than 0.5%.

23. As a new article of manufacture, a lithopone possessing relatively low oil absorption and which is highly resistant to sunlight and is practically non-reactive to ultra-violet light and in which the acetic acid soluble zinc calculated as zinc oxide does not exceed 1%.

24. As a new article of manufacture, a lithopone which when exposed to ultra-violet light in the substantial absence of visible light rays is of substantially the same color as a similarly exposed sample of dry crude unmuffled lithopone from which the muffled product was made and in which muffled product the acetic acid soluble zinc calculated as zinc oxide does not exceed 0.5%.

25. As a new article of manufacture, a lithopone which when exposed to ultra-violet light in the substantial absence of visible light rays is of substantially the same color as a similarly exposed sample of dry crude unmuffled lithopone from which the muffled product was made and in which muffled product the acetic acid soluble zinc calculated as zinc oxide does not exceed 1%.

26. As a new article of manufacture, a lithopone which is highly resistant to sunlight and possesses relatively low oil absorption and which is practically non-reactive to ultra-violet light and in which the acetic acid soluble zinc calculated as zinc oxide is less than 0.5%.

27. As a new article of manufacture, a lithopone which is highly resistant to sunlight and possesses relatively low oil absorption and in which the acetic acid soluble zinc calculated as zinc oxide does not exceed 0.5%.

28. As a new article of manufacture, a lithopone which when exposed to ultra-violet light in the substantial absence of visible light rays is of substantially the same color as a similarly exposed sample of dried crude unmuffled lithopone from which the muffled product was made.

29. As a new article of manufacture, a lithopone which when laid down in a water paste and dried on a white porcelain palette is of substantially the same color as the palette when exposed to ultra-violet light in the substantial absence of visible light rays and in which the acetic acid soluble zinc calculated as zinc oxide does not exceed 1%.

30. As a new article of manufacture, a lithopone which when laid down in a water paste and dried on a white porcelain palette is of substantially the same color as the palette when exposed to ultra-violet light in the substantial absence of visible light rays and in which the acetic acid soluble zinc calculated as zinc oxide is less than 0.5%.

In testimony whereof, we affix our signatures.

JAMES A. SINGMASTER.
FRANK G. BREYER.
CLAYTON W. FARBER.